United States Patent [19]

Sengers

[11] Patent Number: 4,652,923
[45] Date of Patent: Mar. 24, 1987

[54] CIRCUIT FOR SIGNAL PROCESSING IN A PICTURE DISPLAY DEVICE

[75] Inventor: Arnoldus P. A. T. Sengers, Nijmegen, Netherlands

[73] Assignee: U.S. Philips Corporation, New York, N.Y.

[21] Appl. No.: 698,299

[22] Filed: Feb. 5, 1985

[30] Foreign Application Priority Data

Feb. 10, 1984 [NL] Netherlands .................... 8400437

[51] Int. Cl.⁴ .................... H04N 5/14; H04N 5/63; H01J 29/70
[52] U.S. Cl. .................... 358/190; 315/411
[58] Field of Search .............. 358/190, 180, 188, 230; 315/408, 411

[56] References Cited

U.S. PATENT DOCUMENTS

| | | | |
|---|---|---|---|
| 3,962,532 | 6/1976 | Aubert et al. | 358/190 |
| 4,000,441 | 12/1976 | Reh et al. | 315/411 |
| 4,188,568 | 2/1980 | Manners | 358/190 |
| 4,215,296 | 7/1980 | Mitamura et al. | 315/411 |
| 4,362,974 | 12/1982 | Dietz | 315/411 |

Primary Examiner—James J. Groody
Assistant Examiner—Cynthia Smith
Attorney, Agent, or Firm—Thomas A. Briody; Jack Oisher; William J. Streeter

[57] ABSTRACT

A circuit for signal processing in a picture display device, comprising a line signal and audio signal processing stages which form part of an integrated circuit. A uni-directionally current-conducting element is provided between a supply terminal of the line signal processing stage and a signal terminal of the audio signal processing stage and a further uni-directionally current-conducting element is provided between the supply terminal of the line signal processing stage and a supply terminal of the audio signal processing stage. The elements are not simultaneously conductive. The signal terminal of the audio signal processing stage can either be a supply terminal for the line signal processing stage or a volume terminal for the audio signal processing stage.

8 Claims, 5 Drawing Figures

CIRCUIT FOR SIGNAL PROCESSING IN A PICTURE DISPLAY DEVICE

The invention relates to a signal processing circuit in a picture display device. A line signal processing stage for processing a line signal for the horizontal deflection and an audio signal processing stage for processing an audio signal for the sound reproduction are provided. The line signal processing stage includes a first terminal which through a first unidirectionally current-conductive element is a supply terminal and the audio signal processing stage including a second terminal which is connected to the first terminal through the second uni-directionally current-conducting element. The current-conducting are not simultaneously conductive.

Such a circuit is disclosed in the German Patent Application No. 2,220.170. In this prior art circuit a plurality of supply voltages is generated by the circuit for the horizontal deflection. One of these voltages is applied through the first uni-directionally current-conducting element to the first terminal which is a supply terminal for the line signal processing stage. A supply voltage is directly applied by a mains rectifier to the second terminal which is a supply terminal for the audio signal processing stage. The second uni-directionally current conducting element which interconnects the two terminals is non-conducting. During a settling period after switch-on of the picture display device, the first element is, however, non-conducting whilst the second element conducts, in which period both said processing stages are supplied with supply energy by the mains rectifier.

SUMMARY OF THE INVENTION

It is an object of the invention to provide a circuit of the above-mentioned type in which the second terminal has a dual function. According to the invention the circuit is at least partly incorporated in an integrated circuit having connecting terminals to which said first and second terminals are internally coupled. The second terminal is a supply terminal for the line signal processing state when the second uni-directionally current-conducting element is conductive and while the first uni-directionally current-conducting element is non-conductive. The second terminal is a volume level terminal for the audio signal processing stage when said first uni-directionally current-conducting element is conductive and while the second uni-directionally current-conducting element is non-conductive. A third terminal is a supply terminal for the audio signal processing stage.

According to the invention the second terminal functions in both the line signal and the audio signal processing stages. These stages are very different stages for the processing of widely different signals which must definitely not influence each other. Thanks to these combined functions the number of terminals of the integrated circuit can be reduced. The second terminal is not a supply terminal for the audio signal processing stage, which is possible because this stage is supplied with supply energy by a different terminal.

Advantageously the integrated circuit has a first connecting terminal which is internally connected to the third terminal and through the first uni-directionally current-conducting element to the first terminal and externally to a supply voltage circuit. A second connecting terminal is connected to the second terminal. As a result thereof the first terminal of the integrated circuit is a supply terminal for both said processing stages, whilst the second terminal has the two above-mentioned functions.

If the supply voltage circuit comprises a mains rectifier, then the second connecting terminal is externally connected to a volume-setting device. If, in contrast therewith the supply voltage circuit forms part of an output stage coupled to an output of the line signal processing stage, then the second connecting terminal is externally connected to a switching stage which is controlled by the output stage. The switching stage connects the second connecting terminal to a current source. The current source is derived from the mains voltage when the second unidirectionally current-conducting element conducts while the first uni-directionally current-conducting element does not conduct. The switching stage connects the second connecting terminal to a volume-setting device, when the first uni-directionally current-conducting element conducts and the second is non-conducting.

A circuit in which the supply voltage circuit forms part of an output stage coupled to an output of the line signal processing stage and in which an output of the audio signal processing stage is coupled to an audio output stage which comprises a volume-setting device has the second connecting terminal externally connected to a current source which is derived from the mains voltage. In this case the circuit audio signal processing stage comprises an amplifier for amplifying the audio signal set for its maximum gain.

The invention will now be further described by way of example with reference to the accompanying Figures.

DESCRIPTION OF THE PREFERRED EMBODIMENT

Figure 1:
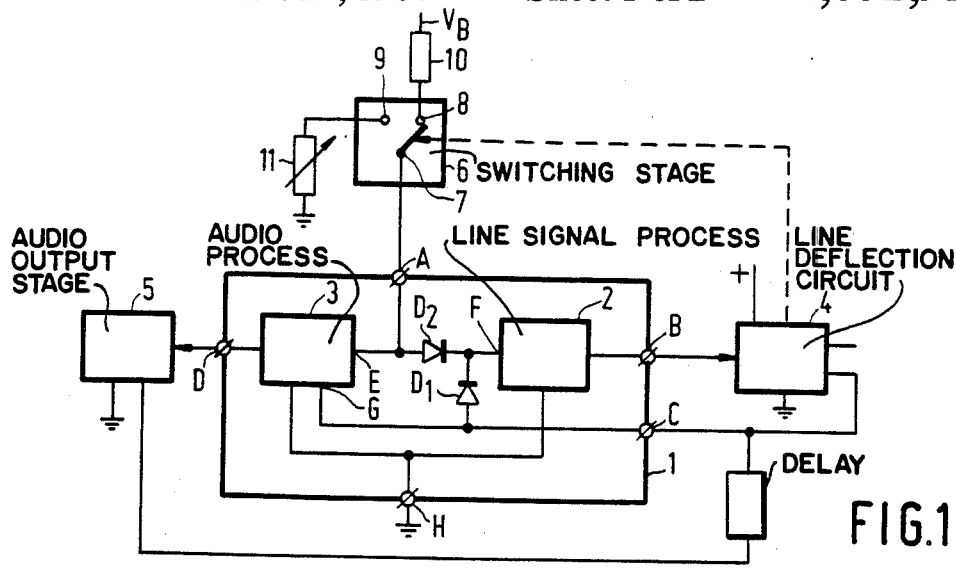
FIG. 1 shows a first application of the circuit according to the invention.

In FIG. 1, reference numeral 1 denotes an integrated circuit which comprises several portions of a picture display device, for example a television receiver. One of these portions is a line signal processing stage 2 in which a line signal is processed in known manner for the horizontal deflection in a picture display tube, not shown. Circuit 1 also comprises an audio signal processing stage 3 in which an audio signal is processed in known manner for sound reproduction. An output signal of stage 2 is applied by a connecting terminal 8B to a line output stage 4 which is external of the circuit 1. Similarly, an output signal of stage 3 is applied by a connecting terminal D of circuit 1 to an audio output stage 5 which is external of the circuit 1.

A further connecting terminal A of circuit 1 is connected to a signal terminal E of stage 3. Arranged between terminal E and a supply terminal F of stage 2 is a diode D2, the anode of diode D2 being connected to terminals A and E and the cathode to terminal F. The anode of a diode D1 is connected to a connecting terminal C of circuit 1, whilst the cathode is connected to terminal F. Terminal C is also connected to a supply terminal G of stage 3 and also to the supply terminals of other portions, not shown, of the integrated circuit 1. A point of each of the different portions of circuit 1 is connected to a terminal H of circuit 1 which is connected to ground.

A switching stage 6 having a change-over switch whose master contact 7 is also connected to terminal A is provided externally of circuit 1. Under the control of a signal coming from line output stage 4, contact 7 can be connected either to a selector contact 8 or to a selector contact 9. Contact 8 is connected by a resistor 10 to the positive terminal of a d.c. voltage source whose negative terminal is connected to ground and whose voltage $V_B$ of, for example, 300 V is derived from the electric mains supply by rectification. Contact 9 is connected to an adjustable resistor 11 whose other terminal is connected to ground.

On switch-on of the picture display device voltage $V_B$ and the supply voltage for stage 4 are produced whilst no voltage is present yet at terminal C. Switching stage 6 is in the state in which contacts 7 and 8 are interconnected. In these circumstances a current of approximately 6 mA flows to terminal F through resistor 10 and diode D2. Stage 2 comprises a line oscillator which starts oscillating with the result that a switching signal is applied to stage 4 through terminal B. In known manner stage 4 which is a line deflection circuit generates the line deflection current and also the high voltage for the final anode of the picture display tube, Stage 4 also generates supply voltages. One of these voltages is applied to terminal C as a supply voltage for the portions of circuit 1. After a settling period following switch-on, this voltage has a value which is sufficient for the operation of said portions, as a result of which stages 2 and 3 are supplied with the signals intended for them. Stage 4 also generates the supply voltage for stage 5.

At the instant at which the voltage at terminal C becomes higher than the voltage at terminal A diode D1 becomes conductive, causing diode D2 to be cutoff. Terminals F and C are now interconnected and stage 2 is now fed by the voltage at terminal C. Stage 3 is also supplied with this voltage. In this final state switching stage 6 is now controlled by output stage 4 such that contacts 7 and 9 are interconnected. Stage 3 is arranged such that resistor 11 which is now connected to terminal E can provide the setting for the volume.

From the foregoing it will be apparent that during the settling period terminal A is connected to the supply terminal F of stage 2 for applying a supply current to this stage, in which period this current has no influence on stage 3. After the settling period terminals A and F are interconnected.

After the setting period terminals A and F are isolated from each other and terminal A is a volume level terminal for determining the amplitude of the audio signal applied to terminal D. The volume can be set in a known way other than with the aid of an adjustable resistor, for example with the aid of an adjustable voltage.

Figure 2:
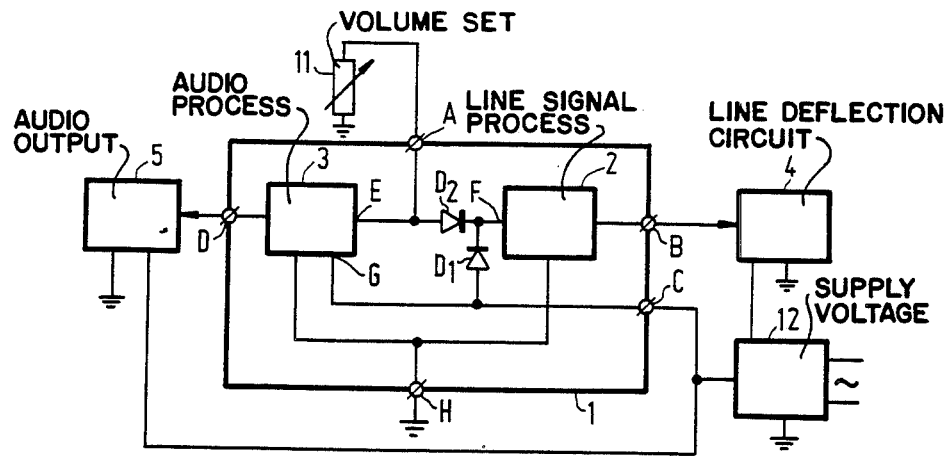
FIG. 2 shows a second application of the circuit according to the invention.

The construction shown in FIG. 1 holds for the case in which the supply voltage for stage 2 is generated by line output stage 4, which requires an external switching stage 6. FIG. 2 in which components which are the same as those in FIG. 1 have been given the same reference numerals, shows an embodiment in which the supply voltages for stage 2 and other portions of circuit 1 and for stages 4 and 5 are produced by a supply voltage circuit 12 connected to the mains supply. In FIG. 2 circuit 1 is identical to the circuit 1 of FIG. 1. Terminal A is connected to a volume setting device, for example resistor 11, whilst terminal C is connected to circuit 12. In FIG. 2 there are no settling phenomena and terminal A has for its sole function to set the volume. Here the voltage at this terminal is always lower than the voltage at terminal C so that diode D1 is continuously in the conducting stage whilst diode D2 remains non-conducting.

Figure 3:
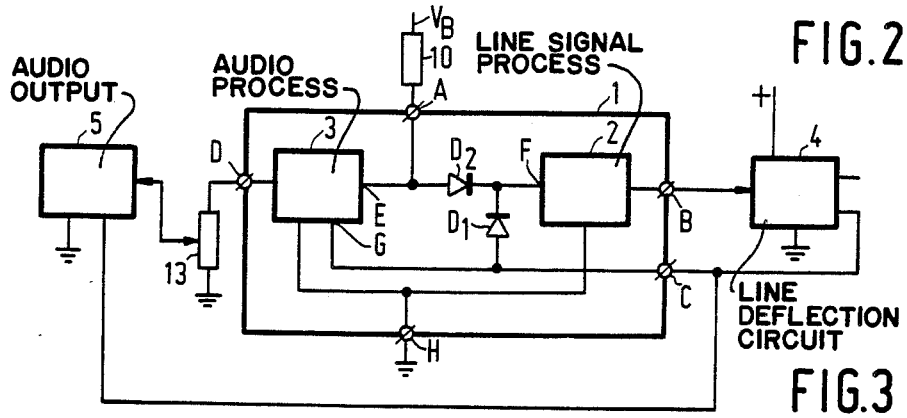
FIG. 3 shows a third application of the circuit according to the invention.

The integrated circuit 1 of FIGS. 1 and 2 can alternatively be connected as shown in FIG. 3. In FIG. 3 the supply voltages for stages 2, 3 and 5 are again generated by output stage 4. The difference with FIG. 1 is the fact that terminal A is connected to resistor 10 without the insertion of a switch, the other terminal of this resistor being connected to voltage $V_B$. During the settling period stage 2 is supplied with supply energy through terminal A and diode D2, whilst the voltage at terminal A does not influence stage 3. After the settling period the voltage at terminal C provides for the supply of voltage to the different portions of circuit 1. Stage 3 is arranged such that the amplitude of the audio signal present at terminal D has the maximum possible value whilst the setting of the volume is effected by means of a suitable arrangement. An adjustable potentiometer 13 can, for example, be connected between terminal D and ground, the movable contact being connected to the input of stage 5. From the foregoing it will be apparent that in the case of FIG. 3 terminal A has no function other than to provide for the supply of stage 2 during the settling period. In both FIG. 1 and FIG. 3 resistor 10 current source for applying a starting current to stage 2.

Figure 4:
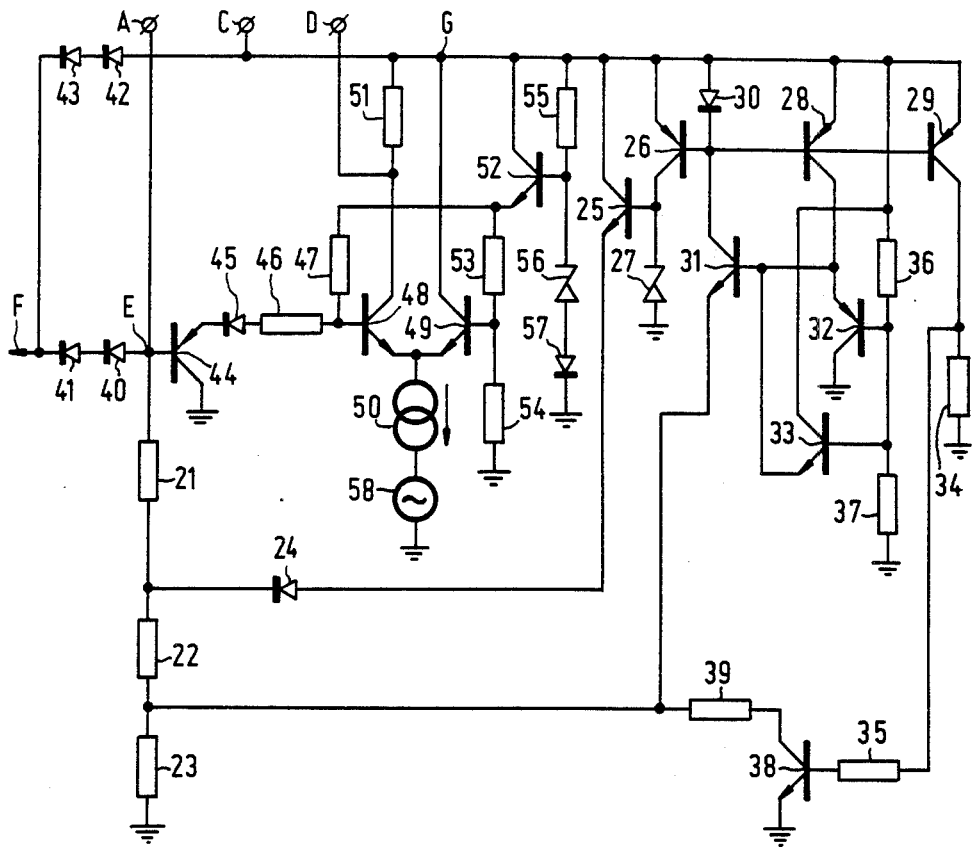
FIG. 4 shows a detailed basic circuit diagram of a portion of the circuit according to the invention and FIG. 5 shows a basic circuit diagram of a different portion of the circuit according to the invention.

FIG. 4 shows in detail a circuit diagram for the audio signal processing stage 3 of the preceding Figures. The series arrangement of three resistors 21, 22 and 23 is connected between terminal E, which is connected to terminal A, and ground via terminal H. The junction between resistors 21 and 22 is connected to the cathode of a diode 24, whose anode is connected to the emitter of an npn-transistor 25. The base of transistor 25 is connected to the collector of an npn-transistor 26 and to the cathode of a zener diode 27, whose anode is connected to ground. The base of transistor 26 is connected to the bases of two further pnp-transistors 28 and 29, to the cathode of a diode 30 and to the collector of an npn-transistor 31, whose emitter is connected to the junction between resistors 22 and 23. The collector of transistor 25, the anode of diode 30 and the emitters of transistors 26, 28 and 29 are connected to terminal G. Terminal G is connected to terminal C. The collector of transistor 28 is connected to the base of transistor 31, to the emitter of a pnp-transistor 32 and to the emitter of an npn transistor 33, whilst the collector of transistor 29 is connected to a resistor 34 and to a resistor 35. The collector of transistor 32 and the other terminal of resistor 34 are connected to ground whilst the bases of transistors 32 and 33 are interconnected and connected to the junction between two resistors 36 and 37 which form a voltage divider between terminal G and ground. The collector of transister 33 is connected to terminal G. Stage 3 also comprises an npn-transistor 38 whose collector is connected to the junction between resistors 22 and 23 via a resistor 39 and whose base is connected to that terminal of resistor 35 which is not connected to transistor 29, whilst the emitter is connected to ground. The series arrangement of two diodes 40 and 41 which conduct in the direction from A to F is connected between terminals A and F, these diodes having the function of diode D2 in FIGS. 1, 2 and 3. In a similar way the series arrangement of two diodes 42 and 43 which conduct in the direction from C to F is connected between terminals G and F, these diodes having the function of diode D1 in FIGS. 1, 2 and 3.

In addition, connected to terminal E is the base of a pnp transistor 44 whose collector is connected to ground, whereas the emitter is connected through a diode 45 having the same conductivity direction and a resistor 46 to a resistor 47 and to the base of an npn-transistor 48. The emitter of transistor 48 is connected to the emitter of a further npn-transistor 49 and to a current source 50. The collector of transistor 48 is connected to terminal D and to a resistor 51, whose other terminal is connected to terminal G. The collector of an npn-transistor 52 and the collector of transistor 49 are also connected to terminal G. The emitter of transistor 52 is connected to a resistor 53, whose other end is connected to the base of transistor 49, and to that terminal of transistor 47 which is not connected to transistor 48. A resistor 54 is arranged between the base of transistor 49 and ground and a resistor 55 is arranged between the base of transistor 52 and terminal G, whilst the series arrangement of a Zener diode 56 and a diode 57 is included between the base of transistor 52 and ground. In this situation the cathode of diode 56 is connected to the base of transistor 52 and the cathode of diode 57 is connected to ground. Finally, an audio signal source 58 is provided between source 50 and ground. Source 58 represents, for example, an audio demodulator which forms part of circuit 1.

Terminal A provides the starting function for stage 2 if a current is applied to this terminal. In that case a supply current flows to terminal F through diodes 40 and 41. A current flows also through resistors 21, 22 and 23 and causes such a voltage drop that transistor 44 is kept in the non-conducting state. No voltage is present at terminal G, diodes 42 and 43 do not conduct and no audio signal is present at terminal D. The values of resistors 21, 22 and 23 and also the values of resistors 36 and 37 have been chosen such that when the voltage at terminal C increases transistor 31 is not capable of conduction as a result of which transistors 25, 26, 28 and 29 are also non-conducting. The emitter of transistor 52 becomes high. Since transistor 44 remains non-conducting, the base of transistor 48 carries a higher voltage than the base of transistor 49 which is non-conducting, and the gain of transistor 48 is at its maximum. In these circumstances an audio signal which has the maximum possible amplitude is present at terminal D. In the situation outlined here no change occurs after the voltage at terminal C has reached its final value. Thanks to diodes 42 and 43 the starting current has no influence on the stages which are supplied with supply voltage through terminal C.

Terminal A has the volume-setting function if an adjustable resistor is connected thereto, whilst the voltage at terminal C has a value located between, for example, 9.5 and 13.5 V. Because of the choice of the values of resistors 21, 22, 23, 36 and 37 transistor 31 conducts, as a result of which also transistors 25, 26, 28 and 29 conduct. Transistors 32 and 33 ensure that the voltage at the base of transistor 31 cannot fall below a predetermined value and cannot become higher than an other predetermined value, which ensures that transistor 31 conducts without fail at any value of the adjustable resistor. Transistor 38 is used for the same purpose. By means of this transistor resistor 39 is connected in parallel with resistor 23, which decreases the voltage at the emitter of transistor 31. This voltage is proportional to the voltage at the junction point between resistors 21 and 22, which voltage is determined by zener diode 27.

From the foregoing it will be obvious that connecting the adjustable resistor results in a voltage being present at said junction, such a value that the gain of transistor 48 is adjustable and which, furthermore has the correct behaviour changes within the temperature and/or in the supply voltage relative to corresponding changes in the voltage at the base of transistor 49. The temperature behaviour is further improved by means of diodes 24 and 45. The voltage at the base of transistor 44 and consequently the emitter current of this transistor are determined by the choice of the value of the adjustable resistor. This sets the gain of transistor 48. The adjustable resistor, resistor 11 in FIGS. 1 and 2, consequently provides for the volume setting. The value thereof and also the values of resistors 21, 22 and 23 are chosen such that the voltage at the base of transistor 44 can be adjusted between 0 and 3 V. It will be obvious that the adjustable resistor can be replaced by a voltage adjustable between 0 and 3 V.

Figure 5:
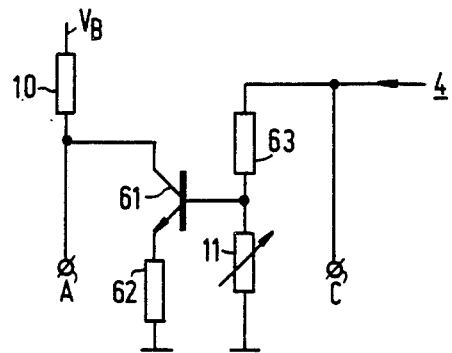

FIG. 5 shows a possible embodiment of the switching stage 6 of FIG. 1, which deviates somewhat from the principle of FIG. 1. Herein resistor 10 is arranged between the source producing voltage $V_B$ and terminal A. The collector of an npn transistor 61 is connected to terminal A, the emitter to a resistor 62 and the base to a resistor 63 and to resistor 11. The other terminal of resistor 63 is connected to terminal C and to a suitable point of stage 4, and those terminals of resistors 62 and 11 which face away from transistor 61 are connected to ground. If no voltage is present at the said point of stage 4 then transistor 61 does not conduct and the starting current for stage 2 flows to terminal A through resistor 10. If the voltage at said point and consequently also at terminal C is indeed present then transistor 61 conducts, more specifically to an extent which depends on the value of resistor 11. This value is set such that the voltage at terminal A is adjusted between substantially 0 and 3 V.

It should be noted that the voltage at point A is high during the increase of the voltage at terminal C which results in the gain of transistor 48 being at its maximum whereafter the gain becomes adjustable. So as to prevent the reproduced sound from having briefly too high an intensity, it is recommended that stage 5 does not immediately amplify the audio signal. This can be accomplished by causing the supply voltage for stage 5 to increase at a later instant than the voltage at terminal C. For this purpose a delay element dy, for example an RC-network can be provided in a simple way between terminal C and the supply terminal of stage 5 which ensures that stage 5 does not amplify until stage 6 has been switched.

It will be obvious that stage 6 may have a construction different from that of FIG. 5 and that stage 3 can be constructed in a way different from that shown in FIG. 4. Stage 3 may, for example, comprise a bistable element for controlling the voltage at the base of transistor 44 which bistable element is in a certain state when a starting current flows, whilst the other state prevails if terminal A has the volume-setting function. It will also be obvious that the manner in which stages 2, 4 and 5 and also circuit 12 are constructed are not important for the invention. The same applies for the number and nature of the portions which, apart from stages 2 and 3 are included in circuit 1. Thus, it is, possible that stage 5 is partly or wholly part of the integrated circuit.

Thus, there is described one example of the invention which is described more particularly by the claims which follow.

What is claimed is

1. In a picture display device, an integrated circuit for processing audio and horizontal line deflection signals comprising:

an audio signal processing stage including a volume control input, a power supply input and associated common terminal, and an output signal terminal;

a line signal processing stage having a power supply input terminal and associated common terminal, and an output terminal, said input terminal connected through a first diode to said volume control input of said audio processing stage, and a second diode connecting said input terminal to said audio processing stage power supply input terminal, said diodes connected in a common polarity with each other for conducting current in a single direction with respect to said input terminal; and first, second and third connecting terminals for said intergrated circuit, connected respectively to said audio signal processing stage power supply input terminal, said audio processing stage volume control input, and to said associated common terminals;

whereby said line signal processing stage may be first energized through said second connecting terminal and thence through said first connecting terminal, whereby said diodes isolate said first and second terminals, permitting said second connecting terminal to alternately serve as an audio control terminal.

2. A circuit as claimed in claim 1, wherein said line signal processing circuit has an output coupled to an output stage, said output stage supplying a power supply voltage to said first connecting terminal, and a switching stage controlled by said output stage, said switching stage connecting either a source of current to said second connecting terminal or a volume control setting device to said second connecting terminal, whereby a supply voltage is supplied through either said second terminal or said first terminal through one of said diodes, and said volume control device is effectively isolated by one of said diodes when said first terminal supplies said current.

3. A circuit as claimed in claim 1, comprising a main rectifier, connected to said first connecting terminal and the second connecting terminal is externally connected to a volume-setting device.

4. A circuit as claimed in claim 2, wherein the audio signal processing stage comprises a voltage source for generating a voltage at the second terminal only upon connection of the volume-setting device to the second connecting terminal, the generated voltage being varied by said volume setting device to control the gain of an amplifier in the audio signal processing stage.

5. A circuit as claimed in claim 4, wherein the audio signal processing stage further comprises a transistor for making the voltage source operative upon connection to the second connecting terminal of the volume-setting device and for making the voltage source inoperative when said second connecting terminal is not connected to said volume-setting device.

6. A circuit as claimed in claim 1, wherein an output stage is coupled to an output of the line signal processing stage, and said output stage supplies a power supply current to said first connecting terminal, and an output of the audio signal processing stage is coupled to an audio output stage comprising a volume-setting device, the second connecting terminal being externally connected to a current source which is derived from a main voltage.

7. A circuit as claimed in claim 6, wherein the audio signal processing stage comprises an amplifier for amplifying the audio signal fixed at a maximum gain.

8. A circuit as claimed in claim 2, an output of the audio signal processing stage being coupled to an audio output stage, and a delay element is connected between the first terminal and the voltage supply terminal of the audio output stage.

* * * * *